United States Patent
Faruque et al.

(10) Patent No.: US 11,325,554 B1
(45) Date of Patent: May 10, 2022

(54) SEAT BOTTOM MOUNTED AIRBAG

(71) Applicant: Ford Global Technologies, LLC, Dearborn, MI (US)

(72) Inventors: Mohammad Omar Faruque, Ann Arbor, MI (US); S. M. Iskander Farooq, Novi, MI (US); Dean M. Jaradi, Macomb, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/115,855

(22) Filed: Dec. 9, 2020

(51) Int. Cl.
- *B60R 21/207* (2006.01)
- *B60R 21/015* (2006.01)
- *B60R 21/2338* (2011.01)
- *B60R 21/00* (2006.01)

(52) U.S. Cl.
CPC ...... *B60R 21/207* (2013.01); *B60R 21/01512* (2014.10); *B60R 21/2338* (2013.01); *B60R 2021/006* (2013.01); *B60R 2021/23386* (2013.01)

(58) Field of Classification Search
CPC ............ B60R 21/207; B60R 21/01512; B60R 21/2338; B60R 2021/006; B60R 2021/23386

See application file for complete search history.

(56) References Cited

U.S. PATENT DOCUMENTS

| | | | |
|---|---|---|---|
| 6,296,292 B1 | 10/2001 | Feldman | |
| 2019/0217805 A1* | 7/2019 | Dry | B60N 2/14 |
| 2020/0114857 A1* | 4/2020 | Jaradi | B60R 21/207 |
| 2020/0164828 A1* | 5/2020 | Park | B60R 21/2338 |
| 2020/0317154 A1* | 10/2020 | Choi | B60R 21/013 |
| 2021/0039578 A1* | 2/2021 | Rupp | B60R 21/23138 |

FOREIGN PATENT DOCUMENTS

| | | | | |
|---|---|---|---|---|
| CN | 112208481 A | * | 1/2021 | ........... B60R 21/207 |
| CN | 112896086 A | * | 6/2021 | ....... B60R 21/23138 |
| EP | 3792119 A1 | * | 3/2021 | ......... B60R 21/2338 |
| JP | 2019146518 A | | 9/2019 | |
| WO | 2019105959 A1 | | 6/2019 | |
| WO | 2019121222 A1 | | 6/2019 | |
| WO | 2019168887 A1 | | 9/2019 | |

\* cited by examiner

*Primary Examiner* — Drew J Brown
(74) *Attorney, Agent, or Firm* — Frank A. MacKenzie; Bejin Bieneman PLC (57) ABSTRACT

A restraint system includes a seat defining a cross-seat axis. The seat includes a seat bottom and a seatback supported by the seat bottom. An airbag is mounted to the seat bottom and is inflatable upwardly from the seat bottom to an inflated position. The airbag, in the inflated position, includes a panel spaced from the seatback and two extensions each extending from the panel to the seatback. The extensions are spaced from each other along the cross-seat axis.

20 Claims, 6 Drawing Sheets

SEAT BOTTOM MOUNTED AIRBAG

BACKGROUND

Pet owners may choose to travel with their pet. For example, the pet owner may travel with their pet in a vehicle, allowing the pet to sit unrestrained in the vehicle. This may allow the pet to wander about the vehicle and to interact with the pet owner while the vehicle is being operated. However, when the pet is unrestrained in the vehicle, the pet's kinematics during a vehicle impact are uncontrolled.

DETAILED DESCRIPTION

A restraint system includes a seat defining a cross-seat axis. The seat includes a seat bottom and a seatback supported by the seat bottom. An airbag is mounted to the seat bottom and is inflatable upwardly from the seat bottom to an inflated position. The airbag, in the inflated position, includes a panel spaced from the seatback and two extensions each extending from the panel to the seatback. The extensions are spaced from each other along the cross-seat axis.

The seat bottom may include a front end spaced from the seatback. The airbag may be disposed at the front end of the seat bottom in an uninflated position.

The panel may be disposed at the front end of the seat bottom in the inflated position.

The panel may include a top spaced from the seat bottom in the inflated position. Each extension may extend from the seat bottom towards the top.

The airbag may include an upper extension disposed between the extensions and the top of the panel. The upper extension may extend from the panel towards the seatback in the inflated position.

The upper extension may extend from one extension to the other extension.

The airbag may include an upper extension spaced from the seat bottom in the inflated position. The upper extension may extend towards the seatback in the inflated position.

The upper extension may extend from one extension to the other extension.

The restraint system may include a plurality of external tethers extending from the seatback to the airbag. The plurality of external tethers may be attached to the seatback and the airbag.

The restraint system may include a pretensioner supported by the seatback. The pretensioner may be engaged with each of the plurality of external tethers.

The restraint system may include a plurality of supports mounted to the seatback. Each external tether may be wrapped partially around one respective support when the airbag is in an uninflated position.

The restraint system may include a plurality of supports mounted to the seatback. Each external tether may be moveably engaged with one respective support.

The plurality of external tethers may be outboard of the airbag relative to the seat.

The plurality of external tethers may be fabric.

The plurality of external tethers may be uninflatable.

The seat may define a seating area. The extensions may extend along the seating area in the inflated position.

The restraint system may include a processor and a memory storing instructions to control inflation of the airbag based on detecting a pet in a seating area of the seat.

The restraint system may include a processor and a memory storing instructions to prevent inflation of the airbag based on detecting a human occupant in a seating area of the seat.

The panel may include two sides spaced from each other along the cross-seat axis. Each extension may be disposed at one respective side.

The seat bottom may extend from the seatback in a seat-forward direction. The panel may be spaced from the seatback in the seat-forward direction.

With reference to the Figures, wherein like numerals indicate like parts throughout the several views, a vehicle 10 is generally shown. The vehicle 10 includes a restraint system 12 having a seat 14 defining a cross-seat axis C. The seat 14 includes a seat bottom 16 and a seatback 18 supported by the seat bottom 16. An airbag 20 is mounted to the seat bottom 16 and is inflatable upwardly from the seat bottom 16 to an inflated position. The airbag 20, in the inflated position, includes a panel 22 spaced from the seatback 18 and two extensions 24 each extending from the panel 22 to the seatback 18. The extensions 24 are spaced from each other along the cross-seat axis C.

Figure 1A:
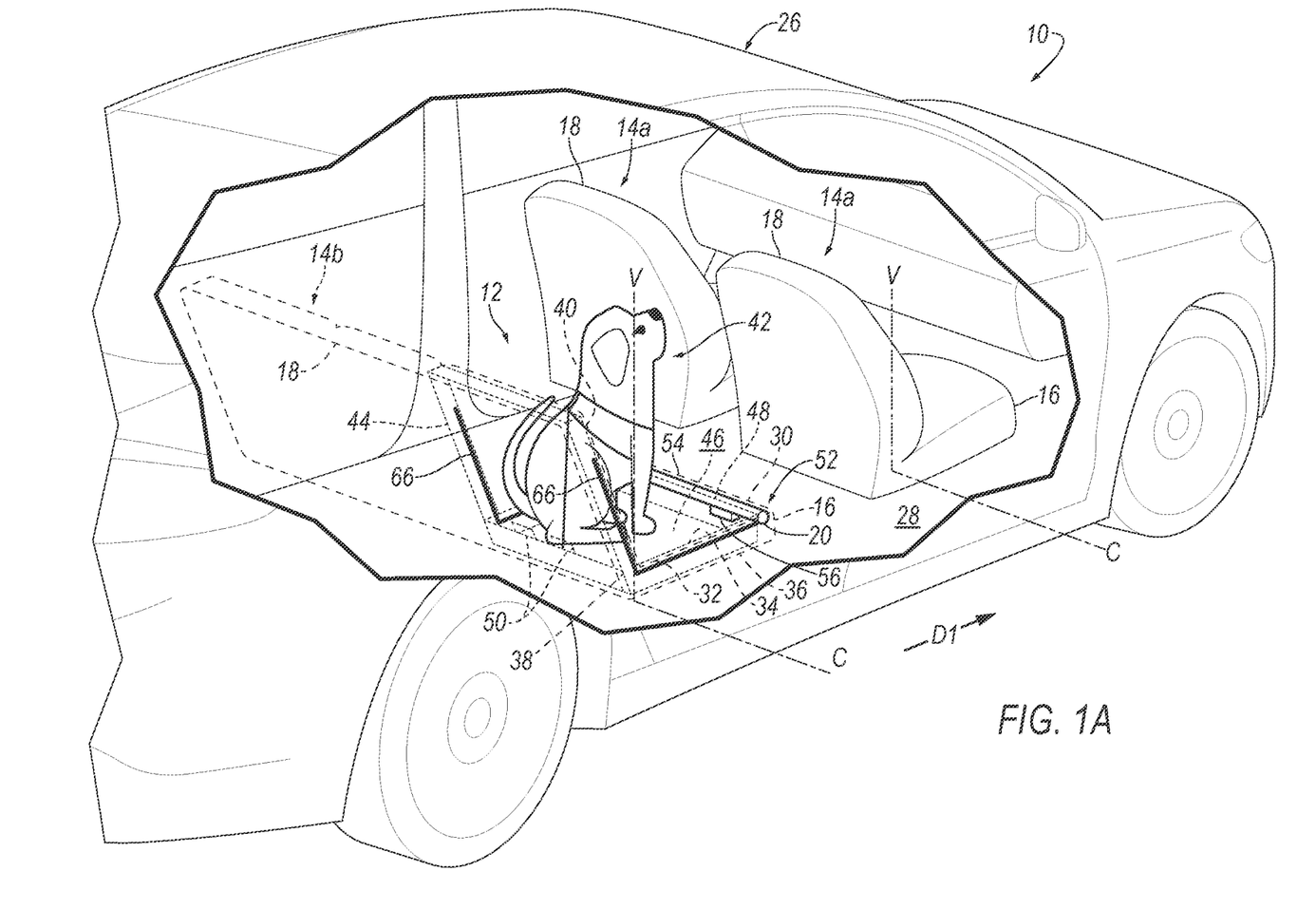
FIG. 1A is a perspective view of the vehicle including an airbag in an uninflated position mounted to a seat bottom.
Figure 1B:
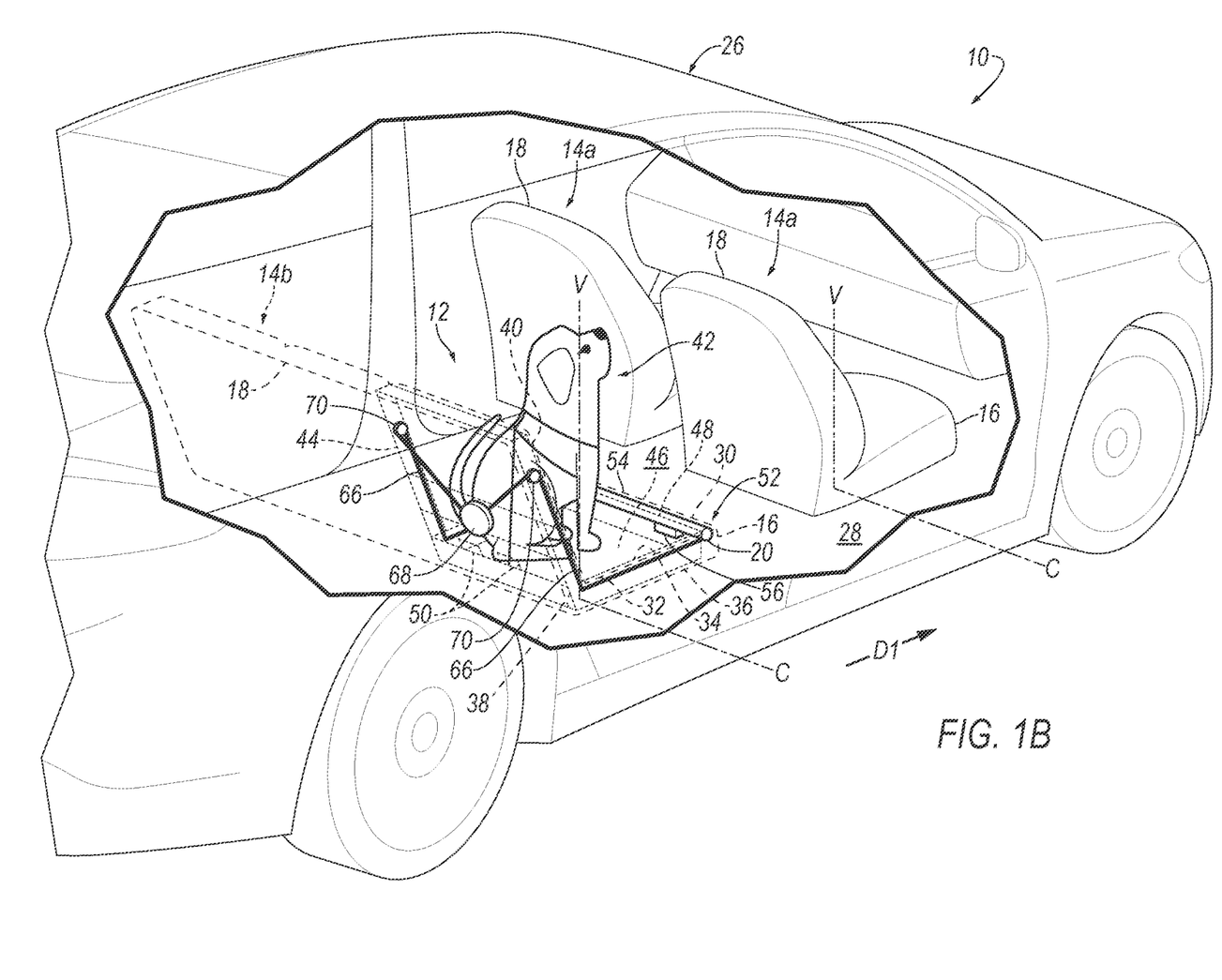
FIG. 1B is a perspective view of the vehicle including the airbag in the uninflated position and a pretensioner engaged with external tethers.
Figure 2A:
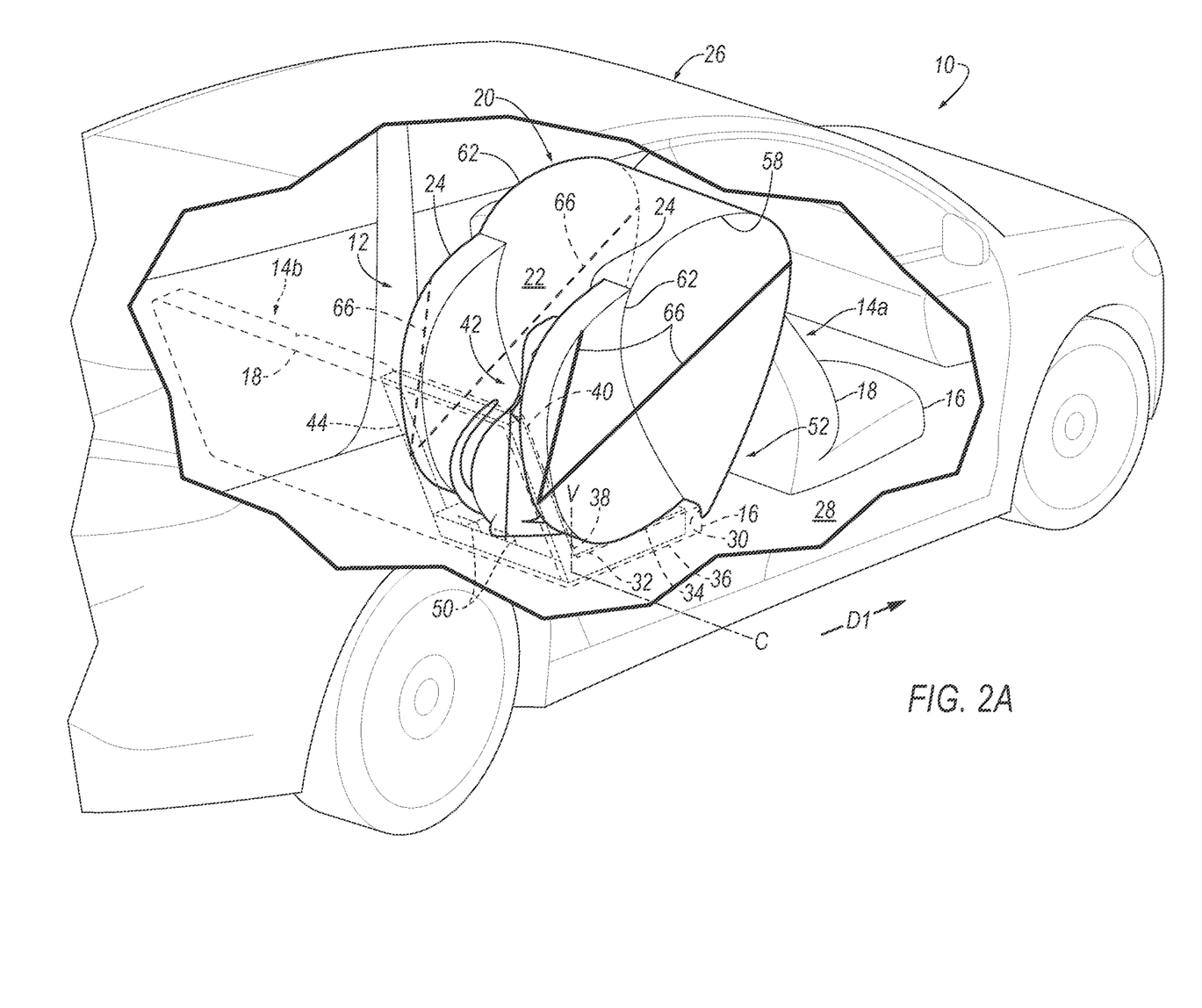
FIG. 2A is a perspective view of the airbag in FIG. 1A in an inflated position.
Figure 2B:
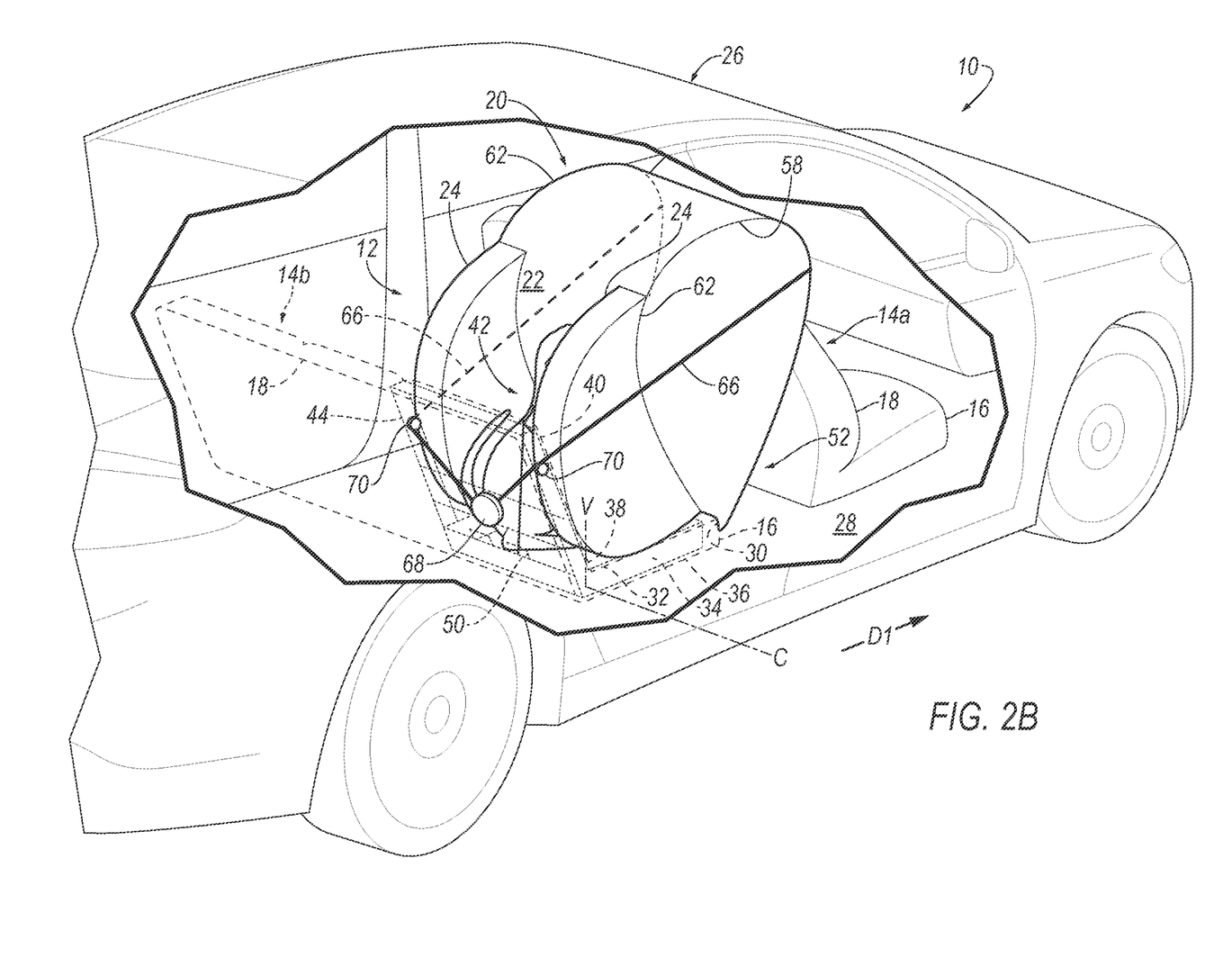
FIG. 2B is a perspective view of the airbag in FIG. 1B in the inflated position.
Figure 3:
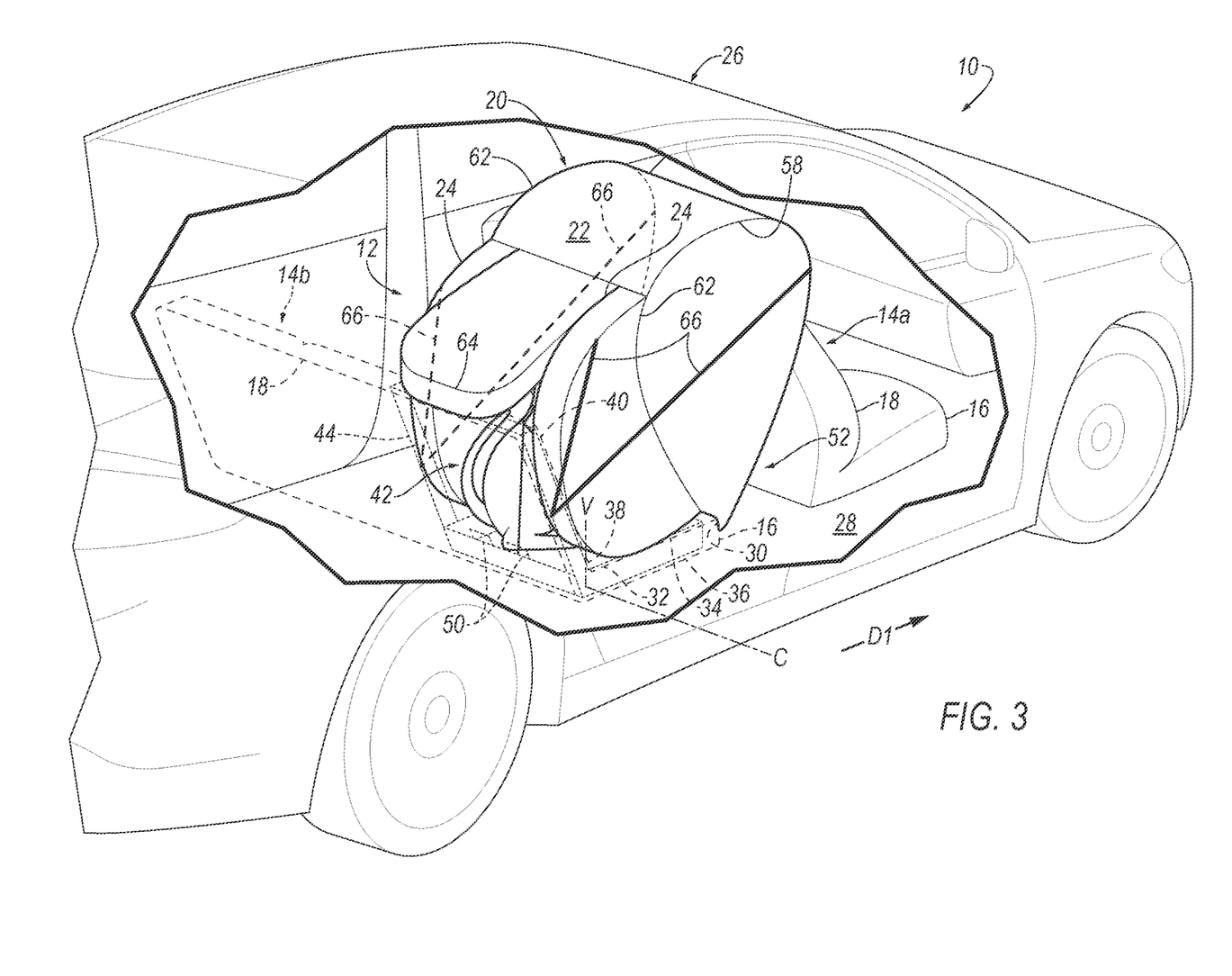
FIG. 3 is a perspective view of another example airbag in the inflated position.

A pet owner may travel in the vehicle 10 with their pet, e.g., a dog. As set forth further below, the vehicle 10 may include a front seat 14a and a rear seat 14b. The pet owner may sit in the front seat 14a and the pet may sit in the rear seat 14b. During a vehicle impact, the airbag 20 may be inflated from an uninflated position, as shown in FIGS. 1A and 1B, to an inflated position, as shown in FIGS. 2A-3. During the vehicle impact, the pet may be forced into the airbag 20 in the inflated position. During the vehicle impact, the airbag 20 may provide coverage so as to control the kinematics of the pet. Because the extensions 24 extend from the panel 22 to the seatback 18, the airbag 20 may increase the likelihood that the airbag 20 provides coverage to control the kinematics of the pet regardless of a direction of the vehicle impact.

With reference to FIGS. 1A-3, the vehicle 10 may be any type of passenger or commercial automobile such as a car, a truck, a sport utility vehicle, a crossover, a van, a minivan, a taxi, a bus, etc. The vehicle 10, for example, may be an autonomous vehicle. In other words, the vehicle 10 may be autonomously operated such that the vehicle 10 may be driven without constant attention from a driver, i.e., the vehicle may be self-driving without human input.

The vehicle 10 includes a body 26 defining a passenger cabin (not numbered) to house occupants, if any, of the vehicle 10. The body 26 may include a roof (not numbered) and a floor 28 with the roof defining an upper boundary of the passenger cabin and the floor 28 defining a lower boundary of the passenger cabin. The body 26 includes doors openable to allow ingress to and egress from the passenger cabin.

The passenger cabin may extend across the vehicle 10, i.e., from one side to the other side of the vehicle 10. The passenger cabin includes a front end (not numbered) and a rear end (not numbered) with the front end being in front of the rear end during forward movement of the vehicle 10. The passenger cabin includes one or more seats 14. The seats 14 may be arranged in any suitable arrangement. For example, one or more of the seats 14 may be at the front end of the passenger cabin, i.e., a front seat 14a, and/or one or more of the seats 14 may be at the rear end of the passenger cabin, i.e., a rear seat 14b. The rear seats 14b may be in a second row of seats, as shown in FIG. 1. As another example, the rear seats 14b may be in a third row of seats. As shown in the Figures, the rear seat 14b may extend in the across the passenger cabin, e.g., from one side to the other side of the vehicle 10.

With continued reference to FIGS. 1A-3, The seatback 18 may be supported by the seat bottom 16 and may be stationary or movable relative to the seat bottom 16. The seatback 18 and the seat bottom 16 may be adjustable in multiple degrees of freedom. Specifically, the seatback 18 and the seat bottom 16 may themselves be adjustable, in other words, adjustable components within the seatback 18 and/or the seat bottom 16 may be adjustable relative to each other.

The seat 14 defines the cross-seat axis C and a vertical axis V transverse to the cross-seat axis C. The seat 14 includes two sides (not numbered) spaced from each other along the cross-seat axis C. The sides extend along the seatback 18 and the seat bottom 16. The sides may support an occupant laterally relative to the seat 14.

As shown in the Figures, the seat bottom 16 includes a front end 30 and a back end 32. The seatback 18 is at the back end 32. The front end 30 is spaced from the back end 32 and the seatback 18. The seatback 18 extends across the seat bottom 16, e.g., from one side of the seat 14 to the other side of the seat 14, at the back end 32.

The seat bottom 16 includes a top 34 and a bottom 36 spaced from the top 34 and the seatback 18 along the vertical axis V. For example, the top 34 of the seat bottom 16 may be adjacent to the seatback 18, and the bottom 36 of the seat bottom 16 may be adjacent to the floor 28.

The seatback 18 includes a bottom 38 at the seat bottom 16 and a top 40 spaced from the bottom 38 and the seat bottom 16 along the vertical axis V of the seat 14. For example, the top 40 may support a head restraint (not numbered), i.e., be disposed between the head restraint and the seat bottom 16.

With continued reference to FIGS. 1A-3, the seat 14 defines a seat-forward direction D1. The seat-forward direction D1 extends forward relative to the seat 14. For example, the seat-forward direction D1 may extend from a rear of the seat 14 to a front of the seat 14 relative to an occupant of the seat 14, i.e., the occupant of the seat 14 faces in the seat-forward direction D1. As another example, the seat bottom 16 may extend from the seatback 18 in the seat-forward direction D1.

The seat 14 defines a seating area 42. The seating area 42 is the area occupied by an occupant, e.g., a pet or a human, when seated on the seat bottom 16. The seating area 42 is in the seat-forward direction D1 of the seatback 18 and above the seat bottom 16. That is, the seatback 18 and the top 34 of the seat bottom 16 face the seating area 42. The seating area 42 for the rear seat 14b may be between the front seat 14a and the seatback 18 of the rear seat 14b.

Each seat 14 is supported by the floor 28, as shown in FIGS. 1A-3. Each seat 14 may slide relative to the floor 28, e.g., in the seat-forward direction D1 or a seat-backward direction. In such an example, the seat 14 may be supported on a seat track (not shown) to allow the seat 14 to move in the seat-forward direction D1 or the seat-backward direction. The seat 14 may be selectively slidable relative to the seat track. In other words, the occupant may slide the seat 14 along the seat track and may secure the seat 14 to the seat track at selected position. For example, the occupant may actuate a motor (not shown) that moves the seat 14 along the seat track. As another example, each seat 14 may be fixed relative to the floor 28. In this situation, the seat 14 may be immovable relative to the floor 28.

With reference to FIGS. 1A and 1B, the seat 14 includes a seat frame 44. The seat frame 44 may include panels and/or may include tubes, beams, etc. The seat frame 44 may be formed of any suitable plastic material, e.g., carbon fiber reinforced plastic (CFRP), glass fiber-reinforced semi-finished thermoplastic composite (organosheet), etc. Alternatively, for example, some or all components of the seat frame 44 may be formed of a suitable metal, e.g., steel or aluminum.

The seat 14 includes a covering 46 supported on the seat frame 44. The covering 46 may be cloth, leather, faux leather, or any other suitable material. The seat 14 may include padding material between the covering 46 and the seat frame 44. The padding material may be foam or any other suitable material. The covering 46 may be stitched in panels around the seat frame 44 and padding material.

With continued reference to FIGS. 1A and 1B, the seat 14, e.g., the covering 46, may include a tear seam 48. The tear seam 48 may be disposed on the seat bottom 16. For example, the tear seam 48 may extend along the front end 32 of the seat bottom 16 adjacent to the airbag 20. Said differently, the airbag 20 may extend through the tear seam 48 in the inflated position. The tear seam 48 may have any suitable shape. For example, the tear seam 48 may have a linear shape, i.e., extending in a line along the seat 14.

The tear seam 48 may be designed to tear apart when subjected to a tensile force above a threshold magnitude. In other words, the covering 46 on one side of the tear seam 48 separates from the covering 46 on the other side of the tear seam 48 when the force is above the threshold magnitude. The threshold magnitude may be chosen to be greater than forces from, e.g., inadvertent pushing against the seat 14 by an occupant but be less than forces from the deployment of the airbag 20. The tear seam 48 may be, for example, a line of perforations through the covering 46, a line of thinner covering material than the rest of the covering 46, etc.

The vehicle 10 may include an infant seat attachment system, e.g., a Lower Anchors and Tethers for Children (LATCH) system. The infant seat attachment system may include one or more anchor brackets 50 each attached to one of the seat 14 or a component of the vehicle 10 adjacent to the seat 14, e.g., the body 26. The pet may wear a harness that is releasably connected to the anchor brackets 50 of the infant seat attachment system, e.g., via one or more attachments configured to attach the harness to the vehicle, as shown in the Figures. As an example, the attachment may be a tether fixed to the harness and attachable to one anchor bracket 50 on the rear seat 14b, e.g., via a clip, hook, etc.

With reference to FIGS. 1A-3, the restraint system 12 includes an airbag assembly 52, which includes the airbag 20, a housing 54, and an inflator 56. The seat 14 may support the airbag assembly 52, and specifically, may support the airbag 20 when the airbag 20 is in the inflated position. The airbag assembly 52 may be mounted to the seat 14, as discussed further below. The restraint system 12 may include any suitable number of airbag assemblies 52, e.g., one or more. For example, the restraint system 12 may include a plurality of airbag assemblies 52. In such an example, the restraint system 12 may include one airbag assembly 52 for each rear seat 14b in the passenger cabin.

The housing 54 houses the airbag 20 in the uninflated position, as shown in FIGS. 1A and 1B, and supports the airbag 20 in the inflated position. The airbag 20 may be rolled and/or folded to fit within the housing 54 in the uninflated position. The housing 54 may be of any suitable material, e.g., a rigid polymer, a metal, a composite, or a combination of rigid materials. The housing 54 may, for example, include clips, panels, etc. for attaching the airbag 20 and for attaching the airbag assembly 52 to the seat 14.

The airbag 20 may be woven nylon yarn, for example, nylon 6-6. Other examples include polyether ether ketone (PEEK), polyetherketoneketone (PEKK), polyester, etc. The woven polymer may include a coating, such as silicone, neoprene, urethane, etc. For example, the coating may be polyorgano siloxane.

The airbag 20 may be a single continuous unit, e.g., a single piece of fabric. Alternatively, the airbag 20 may include a plurality of segments, i.e., two or more. The segments may be attached to each other in any suitable fashion, e.g., a plurality of panels attached by stitching, ultrasonic welding, etc.

The airbag 20 is supported by the seat bottom 16 of the rear seat 14b, as shown in the Figures. In the uninflated position, the airbag 20 may be disposed in the seat bottom 16, e.g., between the covering 46 and the seat frame 44. In other words, the covering 46 may cover the airbag 20 in the uninflated position. The airbag 20 may, for example, be disposed at the front end 32 of the seat bottom 16. As another example, the airbag 20 may be disposed on one side of the seat 14. As yet another example, the airbag 20 may be disposed partially at the front end 32 of the seat bottom 16 and partially on one side of the seat 14.

In the inflated position, the airbag 20 may extend through the seat bottom 16, e.g., the tear seam 48 adjacent to the airbag 20, as shown in FIGS. 2A-3. In this situation, the airbag 20 may extend upwardly from the seat bottom 16, e.g., in a direction towards the roof of the vehicle 10. In the inflated position, the airbag 20 may extend across the seating area 42 to control kinematics of the pet. For example, in the inflated position, the airbag 20 may be disposed at the front end 32 of the seat bottom 16. In other words, the airbag 20 may be disposed between the seatback 18 of the rear seat 14b and the seatback 18 of the front seat 14a.

The airbag 20 may include a plurality of panels, including the panel 22. Each of these panels may extend transverse to each other in the inflated position. In the inflated position, the panel 22 faces a pet on the rear seat 14b, i.e., in the vehicle-rearward direction. For example, the panel 22 may be disposed at the front end 32 of the seat bottom 16 and face toward the seatback 18 of the rear seat 14b. That is, the panel 22 may be spaced from the seatback of the rear seat 14b in the seat-forward direction D1. The panel 22 is positioned to receive and be impacted by the pet when the airbag 20 is inflated during an impact that urges the pet toward the airbag 20. In other words, the panel 22 may be referred to as "an impact panel."

The panels may define an inflation chamber therebetween. During inflation, the inflation chamber may be inflated from the uninflated position to the inflated position. For example, the panel 22 may be in fluid communication with the inflation chamber. In this situation, the panel 22 may be pushed upwardly away from the housing 54 by gas flow in the inflation chamber of the airbag 20 during inflation of the airbag 20.

The panel 22 may include a top 58 spaced from the seat bottom 16 along the vertical axis V in the inflated position. That is, in the inflated position, the top 58 of the panel 22 may be disposed between the seat bottom 16 and the roof. The panel 22 may include two sides 62 spaced from each other along the cross-seat axis C. The sides 62 may extend from the seat bottom 16 to the top 58 of the panel 22. The panel 22 may terminate at the sides 62.

The airbag 20 includes two extensions 24 disposed along the panel 22, as set forth above. The extensions 24 may, for example, be disposed at the sides 62 of the panel 22, as shown in FIGS. 2A-3. The extensions 24 may be of identical construction, and common numerals are used herein to refer to common features of the plurality of extensions 24.

The extensions 24 may be elongated. For example, as shown in FIGS. 2A-3, the extensions 24 may be elongated along the sides 62 of the panel 22 in a direction from the seat bottom 16 to the top 58 of the panel 22, i.e., along the vertical axis V. For example, the extensions 24 may be elongated partially along the sides 62 of the panel 22. In other words, the extensions 24 may be spaced from the top 58 of the panel 22 and/or the seat bottom 16. Alternatively, the extensions 24 may be elongated entirely along the sides 62 of the panel 22, i.e., from the seat bottom 16 to the top 58. The extensions 24 extend along the seating area 42 in the inflated position. Specifically, the extensions 24 extend from the panel 22 to the seatback 18 in the inflated position.

The extensions 24 are in fluid communication with the inflation chamber. In other words, the inflation chamber may extend into the extensions 24 in the inflated position. For example, the extensions 24 may be open to the inflation chamber. Alternatively, for example, a vent (not shown) may be disposed in the inflation chamber at the extensions 24 for controlling gas flow into the extensions 24.

With reference to FIG. 3, the airbag 20 may include an upper extension 64 spaced from the seat bottom 16. For example, the upper extension 64 may be disposed between the top 58 and the seat bottom 16. In the example shown in FIG. 3, the upper extension 64 may be disposed between the extensions 24 and the top 58 of the panel 22 relative to the vertical axis V. As another example, the upper extension 64 may be disposed at the top 58 of the panel 22. In other words, the extensions 24 may be disposed between the upper extension 64 and the seat bottom 16. The upper extension 64 may, for example, cover, i.e., extend overtop of, the extensions 24 in the inflated position. Alternatively, the upper extension 64 may be disposed between the extensions 24 relative to the cross-seat axis C. The upper extension 64 may, for example, extend from one extension 24 to the other extension 24, e.g., along the cross-seat axis C. As another example, the upper extension 64 may be spaced from one or both extensions 24 along the cross-seat axis C.

The upper extension 64 may extend from the panel 22 towards the seatback 18 in the inflated position, i.e., at least partially through the seating area 42 in the vehicle-rearward direction. That is, the extensions 24 and the upper extension 64 may at least partially enclose the pet on the seat 14 in the inflated position. For example, the upper extension 64 may extend to the seatback 18 of the rear seat 14b in the inflated position, as shown in FIG. 3. As another example, the upper extension 64 may be spaced from the seatback 18 of the rear seat 14b in the inflated position.

In examples in which the airbag 20 includes the upper extension 64, the upper extension 64 is in fluid communication with the inflation chamber. In other words, the inflation chamber may extend into the upper extension 64 in the inflated position. For example, the upper extension 64 may be open to the inflation chamber. Alternatively, for example, a vent (not shown) may be disposed in the inflation chamber at the upper extension 64 for controlling gas flow into the upper extension 64.

The airbag 20 may include a plurality of internal tethers (not shown) disposed in the inflation chamber. The internal tethers may extend across the inflation chamber, e.g., from the housing 54 to the panel 22. The internal tethers may be fixed, e.g., via stitching, ultrasonic welding, etc., to the housing 54 and the panel 22 in the inflation chamber. The airbag 20 may include any suitable number of internal tethers. The internal tethers may be any suitable material. For example, the internal tethers may be a same material as the airbag 20. The internal tethers may be positioned to control the shape of the airbag 20.

With continued reference to FIGS. 2A-3, the airbag assembly 52 may include a plurality of external tethers 66 extending from the airbag 20 to the seatback 18. The external tethers 66 may be disposed outboard of the airbag 20 in the inflated position relative to the seat 14, i.e., the airbag 20 is disposed between the external tethers 66. That is, external tethers 66 may be disposed on each side of the airbag 20. The airbag assembly 52 may include any suitable number of external tethers 66. The external tethers 66 may be any suitable material. For example, the external tethers 66 may be a same material as the airbag 20.

The external tethers 66 may be attached to the airbag 20. For example, the external tethers 66 may be attached to the airbag 20 along an axis defined by the external tether 66 and extending from the seatback 18. As another example, an end of the external tethers 66 may be attached to the airbag 20. The external tethers 66 may be attached to the airbag 20, e.g., via stitching, ultrasonic welding, etc. In such an example, the airbag 20 may pull the external tethers 66 out of the seatback 18 during inflation of the airbag 20.

Additionally, the external tethers 66 may be attached to the seatback 18, e.g., the seat frame 44, as shown in FIG. 2B. The external tethers 66 may be attached to the seatback 18, e.g., via stitching, ultrasonic welding, etc. The external tethers 66 may be attached at any suitable location on the seatback 18. For example, the external tethers 66 may be attached to the seatback 18 between the top 40 and the bottom 38. Specifically, external tethers 66 may be attached to each side of the seatback 18.

Alternatively, the external tethers 66 may be engaged with a pretensioner 68, as shown in FIG. 2A. For example, the pretensioner 68 may be fixed to the seatback 18, e.g., the seat frame 44. In such an example, one end of the external tethers 66 may be engaged with the pretensioner 68 and the other end of the external tethers 66 may be attached to the airbag 20. In this situation, the pretensioner 68 may be actuated, e.g., simultaneously with the inflator 56, to retract the external tethers 66 during inflation of the airbag 20, which pulls the external tethers 66 through the tear seam 48. The pretensioner 68 may be any suitable type such as a piston linkage, in which an pyrotechnic charge drives a piston attached to a cable; a ball-in-tube linkage, in which an pyrotechnic charge propels a ball or balls over a cogwheel connected to a cable; a mechanical linkage, in which a compressed spring attached to a cable is released; a rotary pretensioner, in which a pyrotechnic charges rotates a shaft connected to a cable such that the cable wraps around the shaft, or any other suitable type.

In examples in which the external tethers 66 are engaged with a pretensioner 68, the seatback 18 may include a plurality of supports 70, as shown in FIG. 2A. The plurality of supports 70 may be attached to the seat frame 44 and extend outwardly relative to the seat frame 44. The supports 70 may be disposed closer to the top 40 of the seatback 18 than the bottom 38 of the seatback 18. Each external tether 66 may be moveably engaged with one respective support 70. For example, the external tethers 66 may extend, i.e., be wrapped, partially around respective supports when the airbag 20 is in the uninflated position, as shown in FIG. 1A. The external tethers 66 may move relative to the supports 70 during actuation of the pretensioner 68. The external tethers 66 may, for example, be spaced from the supports 70 when the airbag 20 is in the inflated position. As another example, the external tethers 66 may contact the supports 70 when the airbag 20 is in the inflated position. The supports 70 may, for example, be rotatable by the external tethers 66 during retraction of the external tethers 66. That is, the supports 70 may be rotatable relative to the seatback 18. As another example, the supports 70 may be fixed relative to the seatback 18.

The external tethers 66 may be uninflatable. In other words, the external tethers 66 may not define an inflation chamber, e.g., the external tethers 66 may be a panel of material that is not fixed to another panel, or itself, to enclose a volume for receiving inflation medium. The external tethers 66 may be a woven fabric, or any other suitable material.

The external tethers 66 may be under tension when airbag 20 is inflated. In other words, the external tethers 66 may be taught, i.e., not relaxed, when the airbag 20 is inflated. By tensioning the external tethers 66, the external tethers 66 may control the shape of the airbag 20 during inflation. Additionally, the external tethers 66 may be a reaction surface for the airbag 20. That is, the external tethers 66 may provide a counteracting force against the airbag 20 when the airbag 20 is impacted by the pet. In such an example, the external tethers 66 may provide lateral support for the airbag 20, which may assist the airbag 20 in controlling pet kinematics.

The inflator 56 is in fluid communication with the airbag 20. The inflator 56 expands the airbag 20 with inflation medium, such as a gas, to move the airbag 20 from the uninflated position to the inflated position. The inflator 56 may be supported by the seat bottom 16, as shown in FIGS. 1A and 1B. The inflator 56 may be, for example, a pyrotechnic inflator that ignites a chemical reaction to generate the inflation medium, a stored gas inflator that releases (e.g., by a pyrotechnic valve) stored gas as the inflation medium, or a hybrid. The inflator 56 may be, for example, at least partially in the inflation chambers, to deliver inflation medium directly to the inflation chambers, or may be connected to the inflation chambers, through fill tubes, diffusers, etc.

Figure 4:
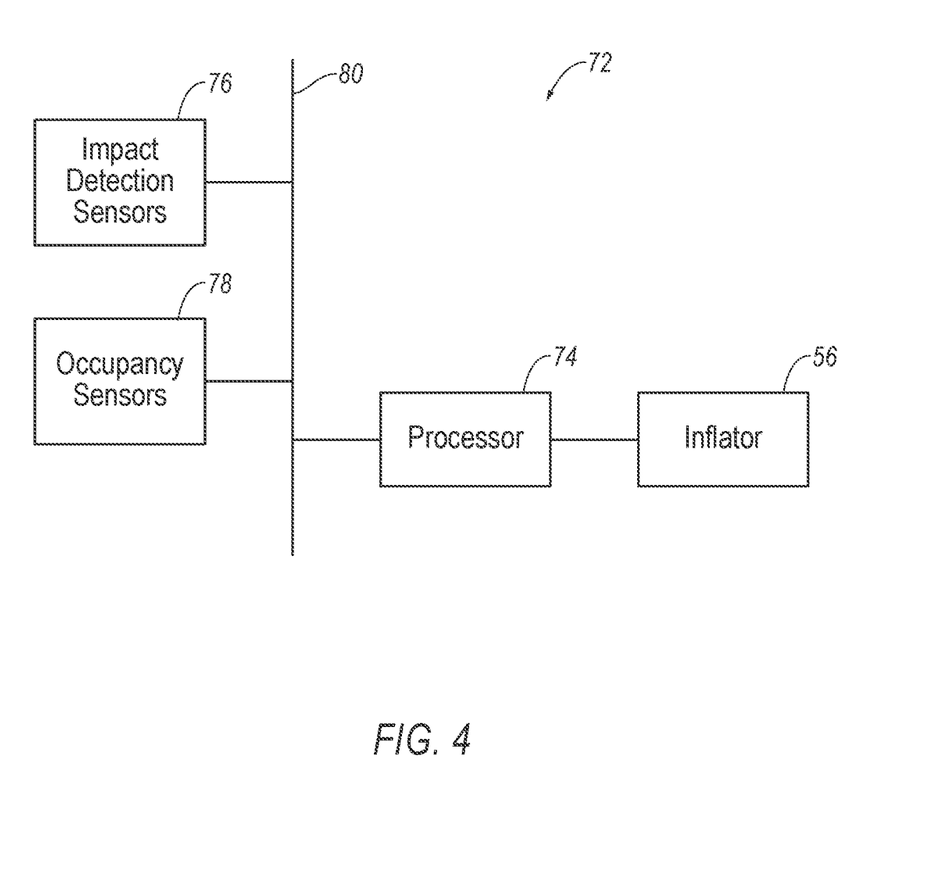
FIG. 4 is a block diagram of an inflation system of the vehicle.

With reference to FIG. 4, the vehicle 10 may include a control system 72. The control system 72 may include a controller, an impact detection sensor 76, an occupancy sensor 78, and the airbag assembly 52, e.g., the inflator 56, in communication through a communication network 80.

The impact detection sensor 76 may be in communication with the controller. The impact detection sensor 76 is programmed to detect an impact to the vehicle 10. The impact detection sensor 76 may be of any suitable type, for example, post-contact sensors such as accelerometers, pressure sensors, and contact switches; and pre-impact detection sensors such as radar, lidar, and vision-sensing systems. The vision systems may include one or more cameras, CCD image sensors, CMOS image sensors, etc. The impact detection sensor 76 may be located at numerous points in or on the vehicle 10.

The control system 72 includes the occupancy sensor 78 for the seat 14. The occupancy sensor 78 may be configured to detect occupancy of the seat 14. The occupancy sensor 78 may be visible-light or infrared cameras directed at the seat, weight sensors inside the seat, sensors detecting whether a seatbelt (not shown) for the seat 14 is buckled or unspooled, or other suitable sensors. The occupancy sensor 78 is in communication with the controller via the communications network 80.

The controller may be a microprocessor-based computing device implemented via circuits, chips, or other electronic components. The controller may include a processor 74, memory, etc. The memory of the controller may store instructions executable by the processor 74 and the processor 74 may read the instructions from the memory and execute the instructions.

The control system may transmit signals through the communications network 80 such as a controller area network (CAN) bus, Ethernet, Local Interconnect Network (LIN), and/or by any other wired or wireless communications network.

The controller may be programmed to selectively initiate inflation of the airbag 20 in response to a detection of a pet in the seat 14 and detection of a sensed vehicle impact. For example, the controller can receive an image of the seat 14 from the occupancy sensor 78. The controller can determine a pet is in the seat 14 by using image processing techniques. The controller can then initiate inflation of the airbag 20 in response to detecting a vehicle impact. For example, in response to receiving signals from the impact detection sensor 76, the controller may initiate inflation of the airbag 20. In other words, in examples in which the impact detection sensor 76 detects a vehicle impact, the controller may send a signal to actuate the inflator 56. In this situation, the inflator 56 discharges inflation medium, which inflates the airbag 20.

The controller may be programmed to prevent inflation of the airbag 20 in response to a detection of a human occupant in the seat 14. For example, the controller can receive an image of the seat 14 from the occupancy sensor 78. The controller can determine a human occupant is in the seat 14 by using image processing techniques. The controller may, for example, then send a signal to prevent inflation of the airbag 20. Alternatively, the controller may not send a signal to the inflator 56 upon detecting a human occupant in the seat 14. In this situation, the airbag 20 is not inflated from the uninflated position to the inflated position during the vehicle impact. Instead, the controller may initiate inflation of other airbags, e.g., curtain airbags, side airbags, etc., in the vehicle 10.

Computing devices, such as the computer, generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper internal and fiber optics, including the internals that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In operation, the airbag 20 is in the uninflated position, under normal operating conditions of the vehicle 10. In the event of a vehicle impact, the impact detection sensors 76 detect the impact. Additionally, the occupancy sensors 78 detect whether a human occupant or a pet is in the seat 14. The impact detection sensors 76 transmit a signal indicating the vehicle impact collision through the communication network 80 to the controller. Additionally, the occupancy sensors 78 transmit a signal indicating a human occupant or a pet is in the seat 14 through the communication network 80 to the controller. When a pet is detected in the seat 14 and the vehicle impact is detected, the controller transmits a signal through the communication network 80 triggering the inflator 56 to inflate the airbag 20 with inflation medium from the uninflated position to the inflated position. When the inflator 56 inflates the airbag 20 to the inflated position, the inflation medium flows into the airbag 20 increasing the pressure in the airbag 20. As the pressure is increased in the airbag 20, the airbag 20 inflates upwardly from the seat bottom 16. The airbag 20 in the inflated position includes the panel 22 at the front end 32 of the seat bottom 16 and the extensions 24 extending from the panel 22 to the seatback 18, i.e., along the seating area 42. As the pet moves relative to the seat 14 due to momentum of the vehicle impact, the pet moves towards the panel 22 and/or the extension(s) 24. When the pet impacts the airbag 20, the airbag 20 control the kinematics of the pet. By having extensions 24 extend along the seating area 42 from the front end 32 of the seat bottom 16 to the seatback 18, the airbag 20 can control the kinematics of the pet regardless of a direction of the vehicle impact.

The disclosure has been described in an illustrative manner, and it is to be understood that the terminology which has been used is intended to be in the nature of words of description rather than of limitation. The adjectives "first" and "second" are used throughout this document as identifiers and are not intended to signify importance or order. Many modifications and variations of the present disclosure are possible in light of the above teachings, and the disclosure may be practiced otherwise than as specifically described.

The invention claimed is:

1. A restraint system comprising:
a seat defining a cross-seat axis, the seat including a seat bottom and a seatback supported by the seat bottom;
an airbag mounted to the seat bottom and being inflatable upwardly from the seat bottom to an inflated position;
the airbag, in the inflated position, including a panel spaced from the seatback and two extensions each extending from the panel to the seatback, the extensions being spaced from each other along the cross-seat axis; and
a processor and a memory storing instructions to control inflation of the airbag based on detecting a pet in a seating area of the seat.

2. The restraint system of claim 1, wherein the seat bottom includes a front end spaced from the seatback, the airbag is disposed at the front end of the seat bottom in an uninflated position.

3. The restraint system of claim 2, wherein the panel is disposed at the front end of the seat bottom in the inflated position.

4. The restraint system of claim 1, wherein the panel includes a top spaced from the seat bottom in the inflated position, each extension extends from the seat bottom towards the top.

5. The restraint system of claim 4, wherein the airbag includes an upper extension disposed between the extensions and the top of the panel, the upper extension extending from the panel towards the seatback in the inflated position.

6. The restraint system of claim 5, wherein the upper extension extends from one extension to the other extension.

7. The restraint system of claim 1, wherein the airbag includes an upper extension spaced from the seat bottom in the inflated position, the upper extension extends towards the seatback in the inflated position.

8. The restraint system of claim 7, wherein the upper extension extends from one extension to the other extension.

9. The restraint system of claim 1, further comprising a plurality of external tethers extending from the seatback to the airbag, the plurality of external tethers are attached to the seatback and the airbag.

10. The restraint system of claim 9, further comprising a pretensioner supported by the seatback, the pretensioner is engaged with each of the plurality of external tethers.

11. The restraint system of claim 10, further comprising a plurality of supports mounted to the seatback, wherein each external tether is wrapped partially around one respective support when the airbag is in an uninflated position.

12. The restraint system of claim 10, further comprising a plurality of supports mounted to the seatback, wherein each external tether is moveably engaged with one respective support.

13. The restraint system of claim 9, wherein the plurality of external tethers are outboard of the airbag relative to the seat.

14. The restraint system of claim 9, wherein the plurality of external tethers are uninflatable.

15. The restraint system of claim 1, wherein the seat defines a seating area, the extensions extend along the seating area in the inflated position.

16. The restraint system of claim 1, further comprising a processor and a memory storing instructions to prevent inflation of the airbag based on detecting a human occupant in a seating area of the seat.

17. The restraint system of claim 1, wherein the panel includes two sides spaced from each other along the cross-seat axis, each extension is disposed at one respective side.

18. The restraint system of claim 1, wherein the seat bottom extends from the seatback in a seat-forward direction, the panel is spaced from the seatback in the seat-forward direction.

19. A restraint system comprising:
a seat defining a cross-seat axis, the seat including a seat bottom and a seatback supported by the seat bottom;
an airbag mounted to the seat bottom and being inflatable upwardly from the seat bottom to an inflated position;
the airbag, in the inflated position, including a panel spaced from the seatback and two extensions each extending from the panel to the seatback, the extensions being spaced from each other along the cross-seat axis; and
a processor and a memory storing instructions to prevent inflation of the airbag based on detecting a human occupant in a seating area of the seat.

20. A restraint system comprising:
a seat defining a cross-seat axis, the seat including a seat bottom and a seatback supported by the seat bottom;
an airbag mounted to the seat bottom and being inflatable upwardly from the seat bottom to an inflated position;
the airbag, in the inflated position, including a panel spaced from the seatback and two extensions each extending from the panel to the seatback, the extensions being spaced from each other along the cross-seat axis;
a plurality of external tethers extending from the seatback to the airbag, the plurality of external tethers being attached to the seatback and the airbag;
a pretensioner supported by the seatback, the pretensioner being engaged with each of the plurality of external tethers; and
a plurality of supports mounted to the seatback, wherein each external tether is moveably engaged with one respective support.

* * * * *